(12) United States Patent
Ozaki et al.

(10) Patent No.: US 7,269,509 B2
(45) Date of Patent: Sep. 11, 2007

(54) IMAGE PLAYBACK DEVICE AND IMAGE PLAYBACK METHOD

(75) Inventors: Hiroshi Ozaki, Tokyo (JP); Katsuo Ogura, Tokyo (JP); Kazuhiro Mino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 274 days.

(21) Appl. No.: 10/998,143

(22) Filed: Nov. 29, 2004

(65) Prior Publication Data
US 2005/0172313 A1    Aug. 4, 2005

(30) Foreign Application Priority Data
Nov. 28, 2003  (JP)  ............................. 2003-399192
Nov. 16, 2004  (JP)  ............................. 2004-332138

(51) Int. Cl.
*G01C 21/26*   (2006.01)

(52) U.S. Cl. .................... 701/211; 701/208; 340/995.1

(58) Field of Classification Search ................ 701/200, 701/207–208, 211, 213–215; 340/988, 990, 340/995.1; 342/357.06, 357.12, 357.13; 700/86, 88; 715/700, 704; 367/274
See application file for complete search history.

(56) References Cited

U.S. PATENT DOCUMENTS

| 6,199,014 | B1 * | 3/2001 | Walker et al. ............... 701/211 |
| 6,437,797 | B1 |   8/2002 | Ota |
| 6,504,571 | B1 * | 1/2003 | Narayanaswami et al. ....... 348/231.99 |
| 6,995,792 | B1 * | 2/2006 | Ogura .................... 348/231.99 |

FOREIGN PATENT DOCUMENTS

| JP | 10-233985 A | 9/1998 |
| JP | 2002-29422 A | 1/2002 |

* cited by examiner

*Primary Examiner*—Y. Beaulieu
(74) *Attorney, Agent, or Firm*—Sughrue Mion, PLLC

(57) ABSTRACT

The image playback device includes: an image database storing, in association with one another, specific places in a predetermined region, photographed images relating to the specific places, position information of photographed places of the photographed images, and photographing time period information of the photographed images; a display section displaying the specific places; a selecting section for selecting a specific place; an operation section for instructing display, in the order of the eras, of the photographed images relating to the specific place selected by the selecting section; and a display control section which, in accordance with operation of the operation section, reads-out the photographed images relating to the specific place from the image database in the order of the eras, and displays the photographed images at the display section.

33 Claims, 11 Drawing Sheets

FIG. 3

| LINE NAME | STATION NAME | IMAGE DATA ADDRESS | REPRESENTATIVE OBJECT IMAGE ADDRESS | PHOTOGRAPHED PLACE COORDINATES | VICINITY REGION COORDINATES | PHOTOGRAPHED DATE |
|---|---|---|---|---|---|---|
| ●● LINE | A STATION | a000h | b000h | (x0,y0) | (x11~x15,y11~y17) | 1975 |
| ●● LINE | A STATION | a100h | b100h | (x1,y1) | (x11~x15,y11~y17) | 2001.3.25 |
| ●● LINE | B STATION | a200h | b200h | (x2,y2) | (x21~x25,y21~y27) | 1983.8.20 |
| ●● LINE | C STATION | a300h | b300h | (x3,y3) | (x31~x35,y31~y37) | 1965 |
| ×× LINE | G STATION | a400h | b400h | (x4,y4) | (x41~x45,y41~y47) | 1993.7 |
| ... | | | | | | |
| □□ LINE | Y STATION | a800h | b800h | (x8,y8) | (x81~x85,y81~y87) | 2003.8.8 |
| □□ LINE | Z STATION | a900h | b900h | (x9,y9) | (x91~x95,y91~y97) | 2000.1.20 |

F I G. 11
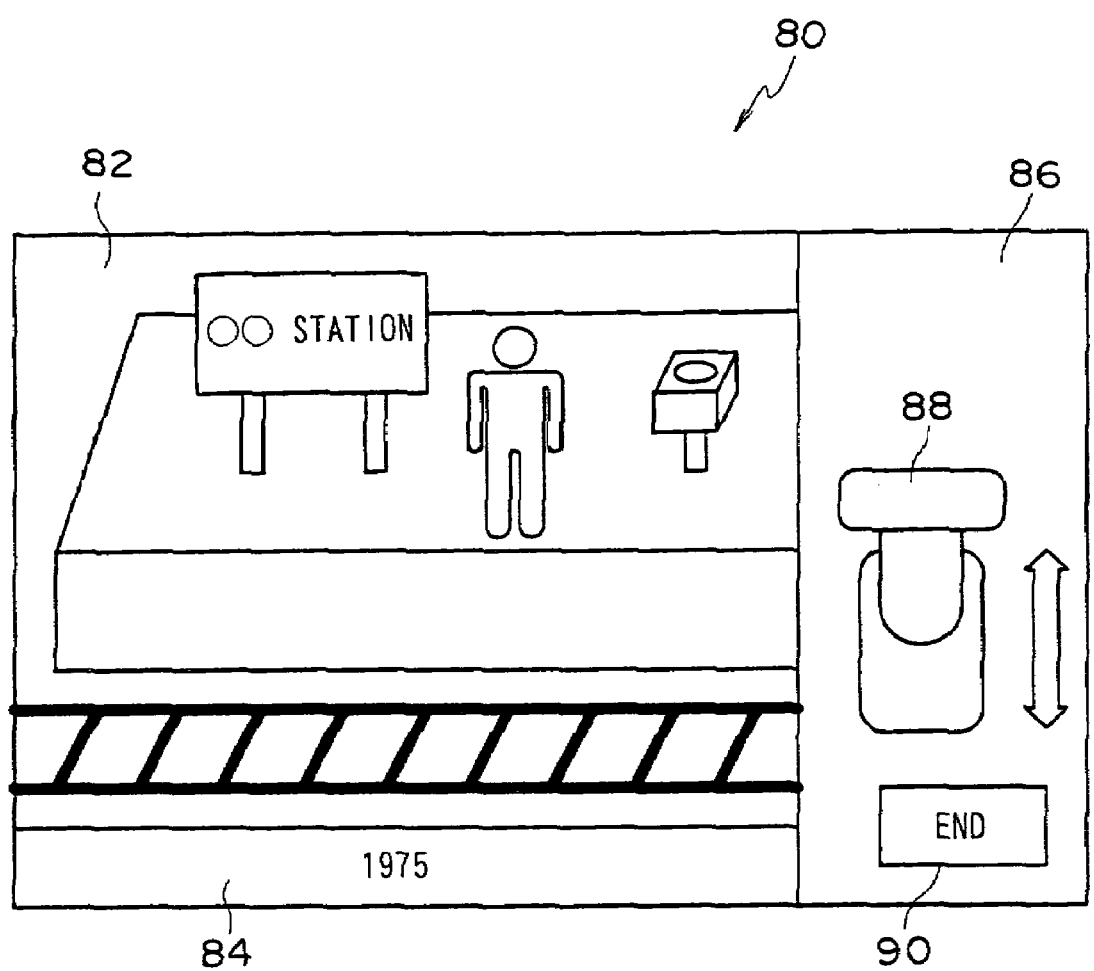

IMAGE PLAYBACK DEVICE AND IMAGE PLAYBACK METHOD

CROSS-REFERENCE TO RELATED APPLICATION

This application claims priority under 35 USC 119 from Japanese Patent Application Nos. 2003-399192 and 2004-332138, the disclosure of which are incorporated by reference herein.

BACKGROUND OF THE INVENTION

1. Field of the Invention

The present invention relates to an image playback device and an image playback method, and in particular, to an image playback device and an image playback method which play-back photographed images of a specific place such as a station or the like on the line (route) of a railway or the like.

2. Description of the Related Art

A conventional technique has been proposed (see, for example, Japanese Patent Application Laid-Open (JP-A) No. 10-233985) in which images photographed by a digital camera to which a GPS (Global Positioning System) device is connected are categorized efficiently by, on the basis of the GPS information obtained by the GPS device such as position information or time information or the like, reading desired map data from a recording medium which stores map data, and displaying on a monitor an electronic map including the photographed (shot) place.

Further, JP-A No. 2002-29422 proposes the following technique: a map of railway lines is displayed as an image; a large number of search points are set as regions on the displayed railway line map; and a large number of railway line section maps are provided which have data obtained by the measured data of the regions being made into and displayed as images in accordance with the positions of the search points. When a given point on the railway line map, which is displayed as an image, is designated by a pointing device or a cursor, it is judged which of the search points, which are set as regions, that coordinate is. The railway line section map of the position which corresponds to the search point obtained in accordance with this judgment is displayed as an image.

Railway companies and the like, which serve residents daily, have stored and recorded, as photographs, the changing state of the landscape from the past through the present in the vicinities of the stations on their lines. Not only are these photographs being used in preparing the company histories of the railway companies and the like, but they are also being released to the residents in those regions. This is a business service being provided from a business organization to the residents living in new cities or regions along railway lines which have developed as transit systems have developed, or is being carried out as a public relations measure to promote the features of that city or region along the railway line to others so as to aim for increased activity in the region. In this way, there have been ongoing movements to foster, with the residents of a region, affinity toward that region, and accordingly, attachment to the locality. Thus, image playback devices are desired which can accumulate images which have been photographed from the past through the present at respective stations along a railway line or the like, and which can be used in applications such as, for example, displaying the amounts of accumulated images of each era at each station. Such an image playback device can, for example, prepare a history of localities along a railway line at a railway company or the like, compile a company history, be used at events such as the commemoration of so many years of development of a new city, and the like.

However, the technique disclosed in JP-A No. 10-233985 displays thumbnail images at the positions of the places where the images were photographed. The technique disclosed in JP-A No. 2002-29422 displays inspected and measured data of search points on a railway line. Neither of these techniques can be used in applications such as, for example, displaying, in the order of eras, images which have been photographed from the past through the present in vicinities of respective stations on a railway line, or the like.

SUMMARY OF THE INVENTION

The present invention was developed in consideration of the aforementioned, and provides an image playback device and an image playback method which can display, in the order of eras and by operation of a user, images which have been photographed in vicinities of stations of a railway line or the like.

A first aspect of the present invention is an image playback device including: an image database storing, in association with one another, specific places on a route, photographed images relating to the specific places, position information of photographed places of the photographed images, and photographing time period information of the photographed images; a display section for displaying the specific places on the route; a selecting section for selecting a specific place on the route; an operation section for instructing display, in order of eras, of the photographed images relating to the specific place selected by the selecting section; and a display control section which, in accordance with operation of the operation section, reads-out the photographed images relating to the specific place from the image database in the order of the eras, and displays the photographed images at the display section.

A second aspect of the present invention is an image playback method including: storing, in association with one another and in an image database, specific places on a route, photographed images relating to the specific places, position information of photographed places of the photographed images, and photographing time period information of the photographed images; displaying the specific places on the route; selecting a specific place on the route; instructing display, in order of eras, of the photographed images relating to the selected specific place; and in accordance with the instructing, reading-out the photographed images relating to the specific place from the image database in the order of the eras, and displaying the photographed images.

A third aspect of the present invention is an image playback device including: an image database storing, in association with one another, specific places in a predetermined region, photographed images relating to the specific places, position information of photographed places of the photographed images, and photographing time period information of the photographed images; a display section for displaying the specific places; a selecting section for selecting a specific place on a screen; an operation section for instructing display, in order of eras, of the photographed images relating to the specific place selected by the selecting section; and a display control section which, in accordance with operation of the operation section, reads-out the photographed images relating to the specific place from the image database in the order of the eras, and displays the photographed images at the display section.

A fourth aspect of the present invention is an image playback method including: storing, in association with one another and in an image database, specific places in a predetermined region, photographed images relating to the specific places, position information of photographed places of the photographed images, and photographing time period information of the photographed images; displaying the specific places in the predetermined region; selecting a specific place in the predetermined region; instructing display, in order of eras, of the photographed images relating to the selected specific place; and in accordance with said instructing, reading-out the photographed images relating to the specific place from the image database in the order of the eras, and displaying the photographed images.

The present aspect has an image database storing, in association with one another, specific places in a predetermined region, photographed images relating to the specific places, position information of photographed places of the photographed images, and photographing time period information of the photographed images. Here, "predetermined regions" means regions including plural locations associated with predetermined conditions such as regions on routes. Further, the route is, for example, a railway line or a bus route or the like, and the specific places are, for example, stations on that railway line or bus stops on that route or the like. The photographed images relating to the specific places are not limited to images which were photographed at those specific places themselves, and include images having some relationship to the specific places, such as, for example, images which were photographed in vicinities of the specific places, or the like.

The selecting section is for selecting a specific place in the predetermined region. For example, the predetermined regions and specific places which can be selected can be displayed in a list at the display selection, and the selecting section can be structured so as to enable selection of a desired specific place therefrom.

The operation section is for the user to instruct display, in order of eras, of the photographed images relating to the specific place selected by the selecting section. For example, an input device which is entertaining, such as an operation lever, may be used as the operation section, or the image of an operation lever may be displayed at the display section and the operation lever can be operated on the screen. Here, "era" means a period having a certain time interval, such as a unit of month, day, or hour as well as year.

In accordance with operation of the operation section, the display control section reads-out the photographed images relating to the specific place from the image database in the order of the eras, and displays the photographed images at the display section. For example, when the operation lever is moved in a predetermined direction, the display control section reads-out images successively from the image database and displays the images at the display section, such that the photographed image, which relates to the specific place and which is displayed at the display section, switches successively from an old image to a new image.

In this way, by the operation of the user, the photographed images relating to the selected specific place can be displayed in the order of the eras from the past through the present. Thus, the changes over time relating to the specific place can be easily recognized, with the impression of playing a game.

As described above, in accordance with the present aspect, there is the excellent effect that images photographed in vicinities of stations of railway lines or the like can be displayed in order of eras by operation of the user, such that the changes over time at that station or the like can be easily recognized.

BRIEF DESCRIPTION OF THE DRAWINGS

FIG. 3 is a table showing the schematic structure of management data of the image database;

FIG. 11 is a diagram showing an example of a station image display screen in accordance with the embodiment of the present invention.

DETAILED DESCRIPTION OF THE INVENTION

An example of an embodiment of the present invention will be described in detail hereinafter with reference to the drawings. Note that, in the present embodiment, description is given of a case in which the present invention is applied to a railway line as an example.

Figure 1:
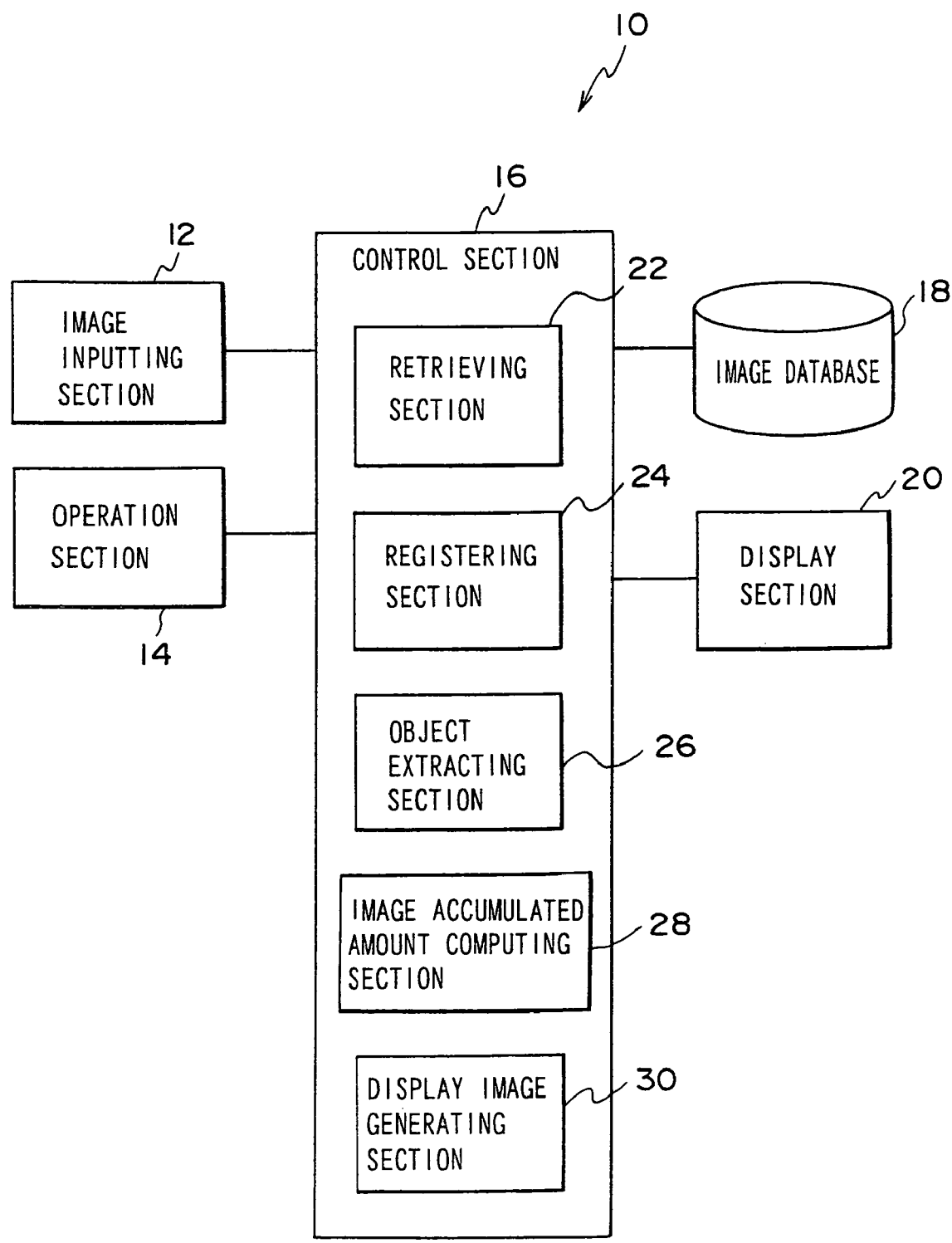
FIG. 1 is a block diagram of an image playback device in accordance with an embodiment of the present invention.

FIG. 1 is a schematic block diagram of an image playback device 10 relating to the present invention. As shown in FIG. 1, the image playback device 10 is structured so as to include an image inputting section 12, an operation section 14, a control section 16, an image database 18, and a display section 20.

The image inputting section 12 is for inputting photographed images. For example, a scanner, which illuminates light onto a reflection original such as a print photograph or the like and reads the image of the original by reading the reflected light, can be used as the image inputting section 12.

It suffices for the image inputting section 12 to be a structure which enables input of an image. The image inputting section 12 is not limited to a scanner, and may be, for example, a film scanner reading a transparent original such as a photographic film or the like, a card reader for reading digital images recorded on a recording medium such as a memory card or the like, a drive device for reading digital images recorded on a CD, a DVD, or the like, a communication interface device which receives digital images transferred via a network, or the like.

The operation section 14 is structured so as to include a keyboard, a mouse, and the like, and is used for selecting a railway line map which will be described later or the like, as well as for various types of operations in accordance with display screens displayed at the display section 20.

The control section 16 governs the control of the respective sections connected to the control section 16, and the overall control of the image playback device 10. The control section 16 is structured so as to include a retrieving section 22, a registering section 24, an object extracting section 26, an image accumulated amount computing section 28, a display image generating section 30, and the like.

Figure 2:
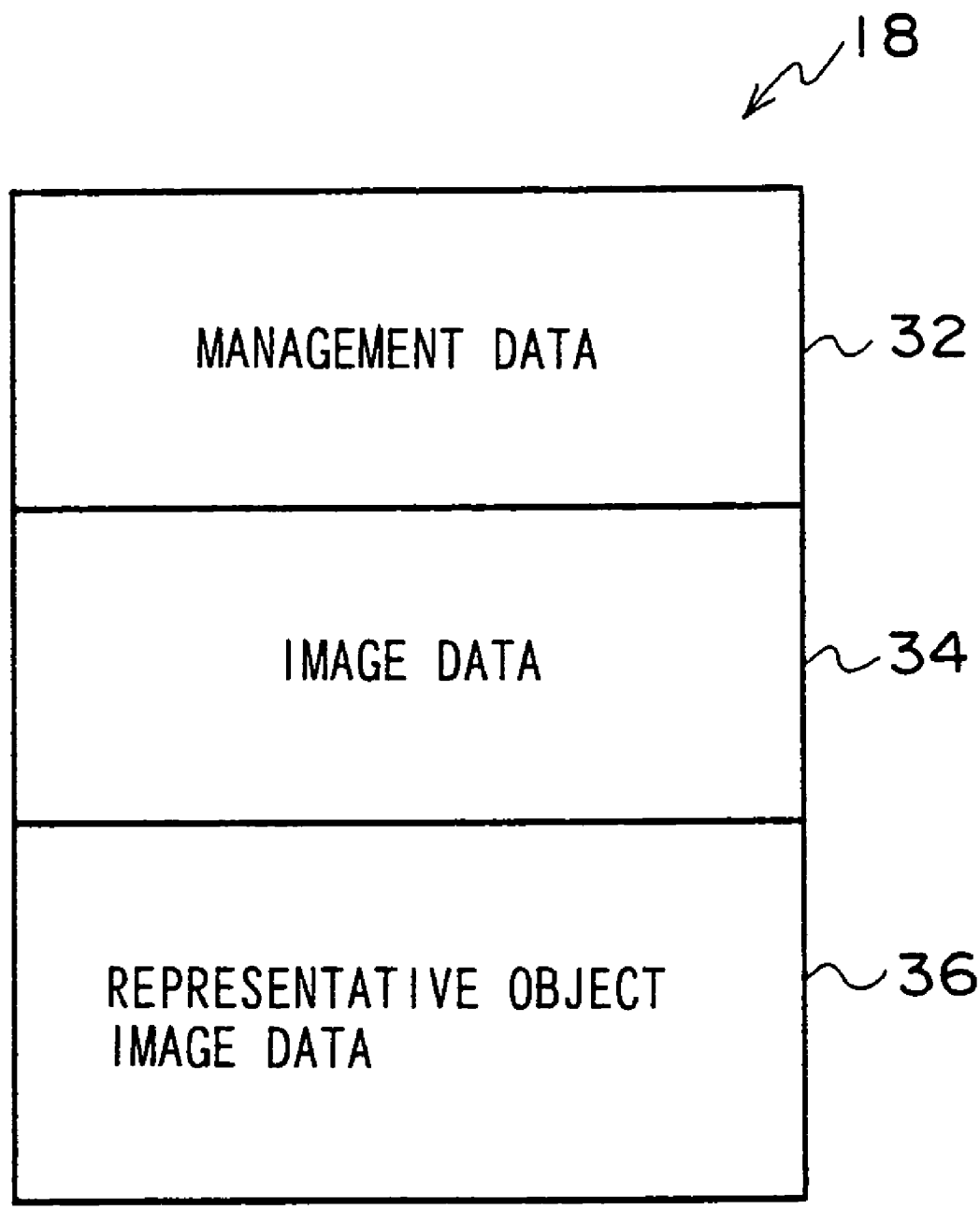
FIG. 2 is a drawing showing storage regions of respective data of an image database structuring the image playback device.

As shown in FIG. 2, the image database 18 is formed from a management data area 32, an image data area 34, and a representative object image data area 36. Management data is stored in the management data area 32, image data is stored in the image data area 34, and representative object image data is stored in the representative object image data area 36. Representative object image data is image data of a representative object included in an image expressed by image data. Image data and the like, of which the photographed place and the like thereof are known, of each station on each railway line are registered in advance in the image database 18.

As shown in FIG. 3, the management data is structured so as to include the names of the railway lines, the names of the stations, image data addresses of photographed images of vicinities of the stations, representative object image addresses of the photographed images, coordinates of the photographed places, vicinity region coordinates expressing vicinity regions of the stations, information such as the photographing dates, and the like. Note that photographed images of vicinities of the stations include photographed images of the stations themselves, and images photographed vicinities of the stations. The coordinates of the photographed places are expressed as, for example, latitude and longitude. The vicinity region is set by, for example, a rectangular region or a circular region or the like, but is not limited to such shapes. The photographing date may be information specified by only the year without going so far as to specify the exact date, or may be information specified by a time period.

The retrieving section 22 retrieves, from the image database 18, in the vicinity of which station the photographed place of the inputted image inputted by the image inputting section 12 is.

Specifically, when the inputted image is, for example, in a format in which incidental information (tag data), which includes various types of information relating to the situation of photographing such as position information of the photographed place, the photographing date, or the like, is added to the photographed image, such as in the case of Exif format (Exchangeable image file format) which is widely used as the format for images photographed by digital cameras, the coordinates of the photographed place, which are expressed by the position information of the photographed place included in the incidental information, and the vicinity region coordinates included in the management data of the image database 18, are compared. As a result, if, among the vicinity regions expressed by the vicinity region coordinates included in the management data of the image database 18, there exist coordinates in which the photographed place of the inputted image is included, the inputted image is judged to be an image photographed the station vicinity corresponding to those vicinity region coordinates.

Further, in the case of a format in which incidental information is not added to the inputted image, an object is extracted from the inputted image by the object extracting section 26, and the extracted object and the representative object images, which are expressed by the representative object image data registered in the image database 18, are compared. If it is found, as a result of this comparison, that a similar object exists, the inputted image is judged to be an image which was photographed in the station vicinity corresponding to that representative object image. In this way, even if incidental information expressing the coordinates of the photographed place is not included in the inputted image, the photographed place can be specified.

The registering section 24 registers, in the image database 18, inputted images for which the photographed place can be specified, representative object images which have been extracted, incidental information, and the like.

The image accumulated amount computing section 28 computes, from the image database 18, the accumulated amount of the images of each station on the railway line set by the user.

The display image generating section 30 generates display images of various types of screens to be displayed at the display section 20, such as a railway line selection screen for selecting a railway line, a screen showing the image accumulated amounts of the respective stations on a selected railway line, and the like. The display image generating section 30 outputs these display images of the screens to the display section 20.

Figure 4:
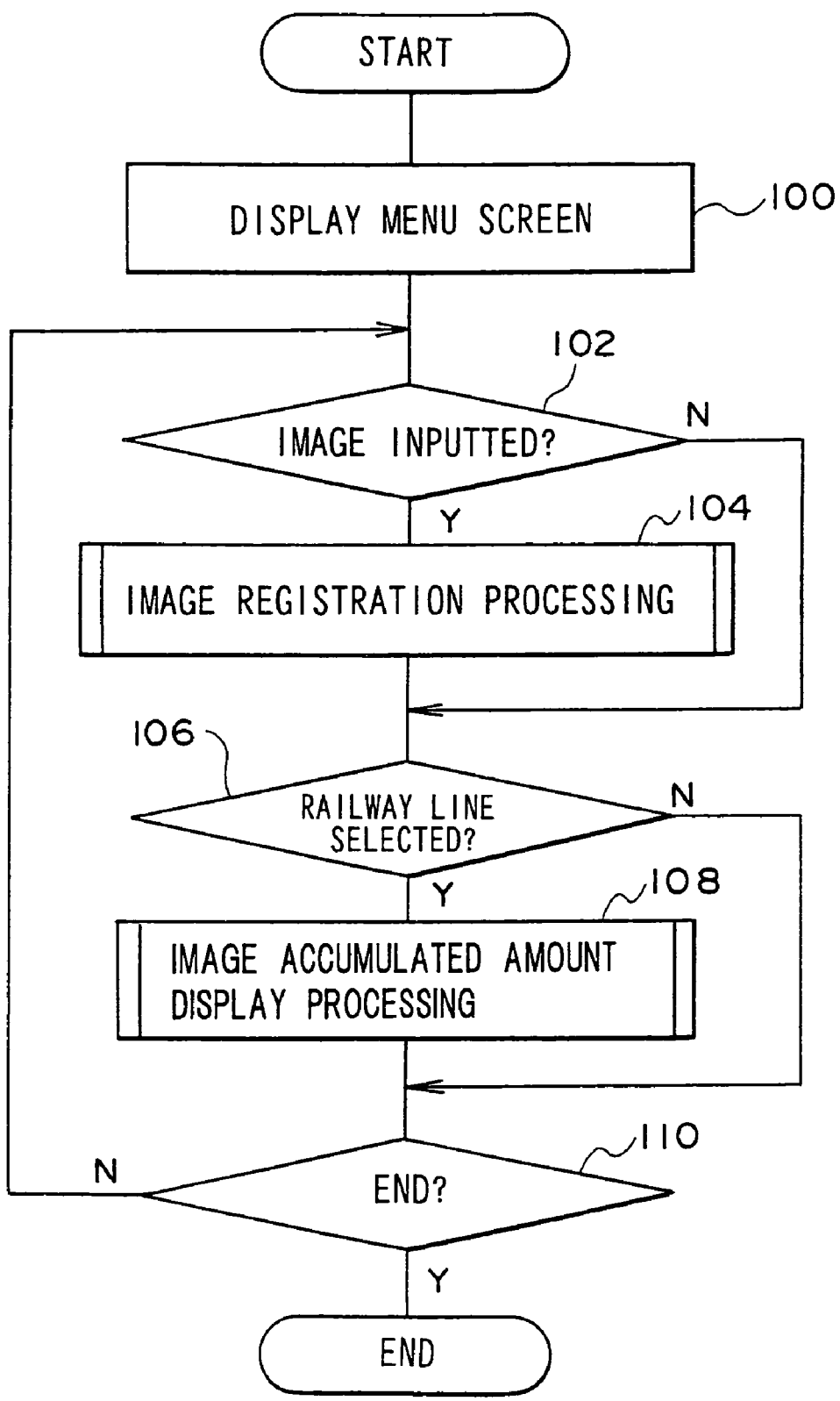
FIG. 4 is a flowchart of a main routine executed at a control section structuring the image playback device.

Next, the processing routine executed at the control section 16 will be described as the operation of the present embodiment, with reference to the flowcharts of FIGS. 4 through 6.

First, the main routine will be described with reference to the flowchart of FIG. 4. In step 100, the image of a menu screen 40, such as that shown in FIG. 7 for example, is generated by the display image generating section 30 and outputted to the display section 20. In this way, the menu screen 40 is displayed at the display section 20.

Figure 7:
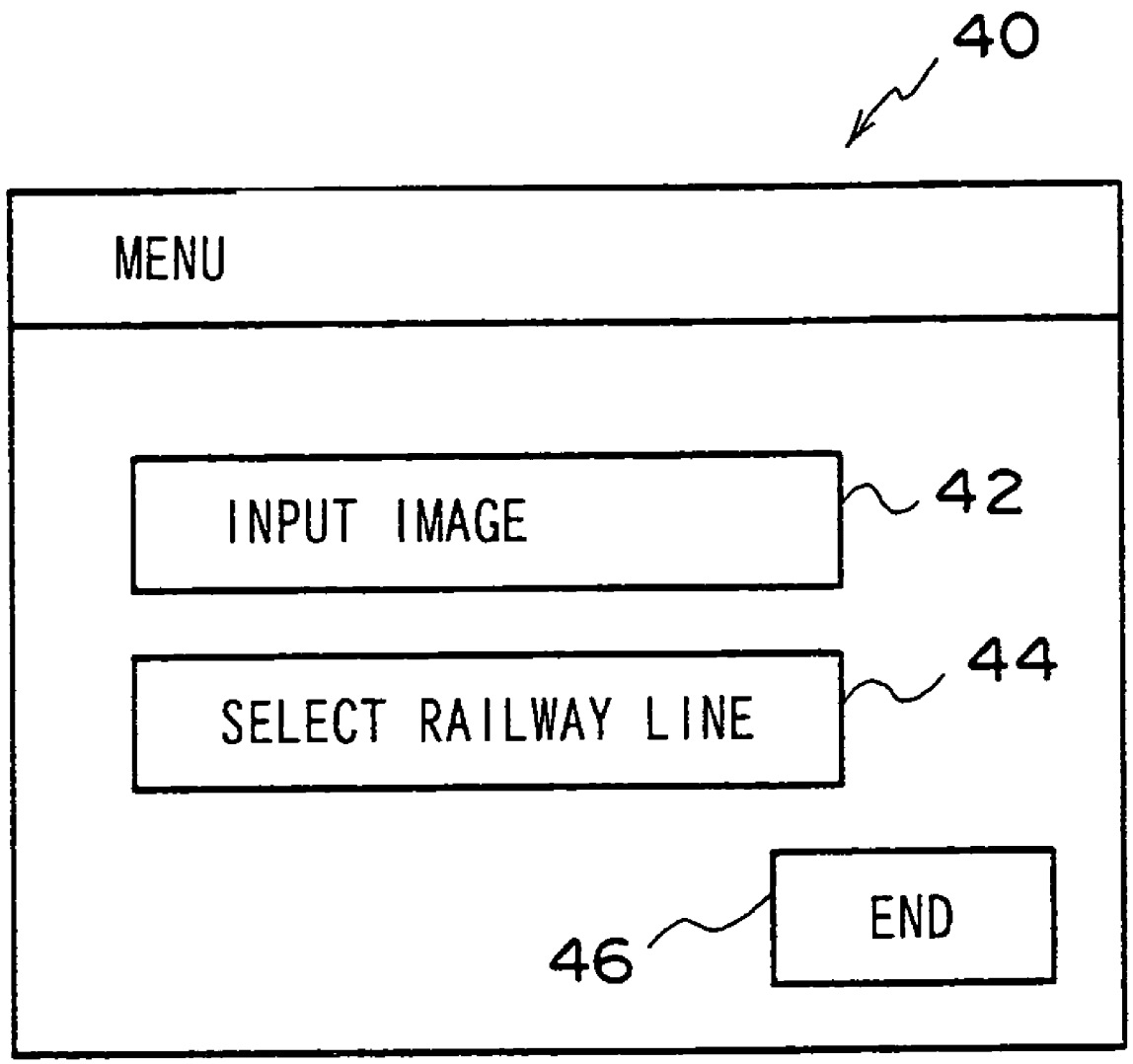
FIG. 7 is a drawing showing an example of a menu screen in accordance with the embodiment of the present invention.

As shown in FIG. 7, the menu screen 40 is a screen at which are displayed an image input button 42 which the user is to select at the time when he/she wishes to input an image which he/she wishes to register in the image playback device 10, a railway line selection button 44 which the user is to select when he/she wishes to select a railway line whose image accumulated amounts he/she wishes to display, and an end button 46 which the user is to select when he/she wishes to end the present routine. The user can select these buttons by operating the operation section 14.

In next step 102, it is judged whether or not the image input button 42 has been selected. If the image input button 42 has been selected, the routine moves on to step 104 where the image registration processing shown in FIG. 5 is executed. On the other hand, if the image input button 42 has not been selected, the routine moves on to step 106.

In step 106, it is judged whether or not the railway line selection button 44 has been selected. If the railway line selection button 44 has been selected, the routine moves on to step 108 where the image accumulated amount display processing routine shown in FIG. 6 is executed. On the other hand, if the railway line selection button 44 has not been selected, the routine proceeds to step 110.

In step 110, it is judged whether or not the end button 46 has been selected. If the end button 46 has been selected, the present routine ends. If the end button 46 has not been selected, the routine returns to step 102, and the same processings as those described above are carried out.

Next, image registration processing will be described with reference to the flowchart of FIG. 5. In step 200, image input processing is carried out. Specifically, if the image inputting section 12 is structured by a scanner for example, the user sets a document thereat and carries out operation for executing reading of the document. In this way, reading of the document is started, and the read image is inputted to the control section 16. Or, if the image inputting section 12 is structured by, for example, a card reader for reading digital images recorded on a recording medium such as a memory card or the like, the user sets thereat a memory card on which images have been recorded, and carries out operation for selecting the image files which he/she wishes to register. That image data is thereby inputted to the control section 16.

In step 202, a representative object is extracted from the image which was inputted from the image inputting section 12, by the object extracting section 26. For example, if plural objects are included in the image, a predetermined type of object (e.g., a building or the like) is extracted as the representative object from among these objects. Any of various conventionally known methods can be used to extract the object. Further, for example, the techniques described in Japanese Patent Applications Nos. 2002-221300 and 2002-221302, which are applications of the present applicant, also can be used. In this way, the type of the object can be identified correctly.

In step 204, it is judged whether or not incidental information, which includes various types of information relating to the time of photographing such as the position information of the photographed place and the like, is added to the inputted image data. If incidental information is added, the routine moves on to step 206, whereas if incidental information is not added, the routine proceeds to step 210.

In step 206, the retrieving section 22 successively compares the coordinates, which are expressed by the position information of the photographed place which is included in the incidental information, and the vicinity region coordinates, which are included in the respective records of the management data of the image database 18. The retrieving section 22 retrieves a record which is such that the photographed place included in the incidental information is included within a vicinity region expressed by vicinity region coordinates of the management data. In other words, it is judged whether or not the inputted image was an image photographed the vicinity of any of the stations of the railway lines which are the display target of the image accumulated amount. Then, if a record, at which the photographed place included in the incidental information is included within a vicinity region expressed by vicinity region coordinates, exists in the image database 18, the photographed place of the inputted image is judged to be the vicinity of the station expressed by the station name of that record, and that station is specified as the station corresponding to the inputted image.

On the other hand, in step 210, because incidental information is not added to the inputted image, the degrees of similarity between the representative object image extracted in step 202 and the registered object images registered in the image database 18 are computed, and a record whose degree of similarity is greater than or equal to a predetermined threshold value is successively searched for. Then, if a record, whose degree of similarity is greater than or equal to the predetermined threshold value exists, the photographed place of that record is specified as the photographed place of the inputted image. Note that the determination of the degree of similarity can be carried out by using a conventionally known method. Or, for example, the technique described in Japanese Patent Application No. 2002-249207, which is an application of the present applicant, also may be used.

In step 208, the inputted image, whose photographed place has been specified, is registered in the image database 18 by the registering section 24. Namely, the image data of the inputted image is stored in the image data area 34 of the image database 18, and the image data of the extracted object image is stored in the representative object image data area 36. Further, the storage address of the image data and the storage address of the object image data are registered as management data. The name of the railway line, the name of the station, the coordinates of the photographed place, the coordinates of the vicinity region, and the photographing data, which are other management data, are registered by using the same data as that of the record retrieved in step 206 or step 210.

Note that, if the photographed place is specified on the basis of the extracted representative object image in step 210, the photographing date may be estimated, and that estimated photographing date may be registered as management data. Estimation of the photographing date can be carried out as follows for example. First, a partial image database, in which photographing time periods and object images are associated with one another for each type of object (e.g., buildings, hairstyles of persons, clothes, small articles, and the like), is prepared in advance. Object images are extracted from the inputted image, and the types of the extracted object images are specified. Then, for each object, it is judged whether or not an object image, which has a high degree of similarity with the extracted object image, exists in the partial image database of the specified type. The photographing time period corresponding to the object image which has the highest degree of similarity is specified as the photographing time period of the inputted image. Moreover, if the photographing date is known in advance, the photographing date may be inputted. In addition, if the photographing date is include in the inputted image, such as in a case in which, for example, the inputted image is an image from a photographic film or a printed photograph at which the photographing date has been recorded together with the image, the photographing date included in the image may be extracted by character recognition processing, and that photographing date may be used.

If the photographed place cannot be specified, i.e., if it is judged that the inputted image was not an image photographed a vicinity of any of the stations on any of the railway lines, that inputted image is not registered in the image database 18, and the present routine ends as is and returns to the main routine. At this time, the fact that the photographing place could not be specified may be displayed at the display section 20.

In this way, an image is inputted, and the number of images registered in the image database 18 increases.

Next, the image accumulated amount display processing for a railway line will be described with reference to the flowchart of FIG. 6.

Figure 8:
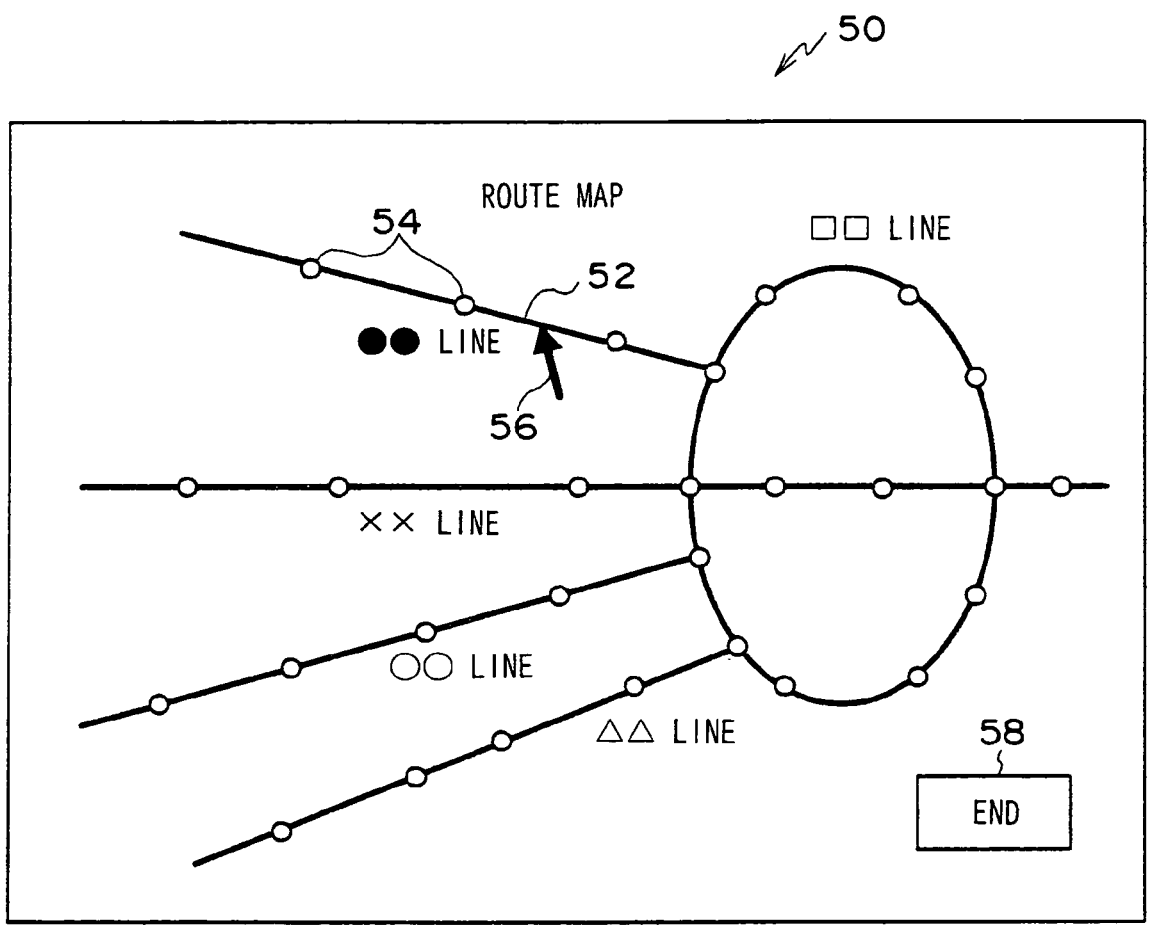
FIG. 8 is a diagram showing an example of a route map display screen in accordance with the embodiment of the present invention.

First, in step 300, an image of a railway line map (route map) 50 such as shown in FIG. 8 is generated by the display image generating section 30, and outputted to the display section 20. In this way, the railway line map 50 is displayed at the display section 20. The railway line map 50 is a map which shows, in a simplified manner, the positional relationships among respective railway lines 52 which are objects of image accumulated amount display. Stations 54 existing on the respective railway lines 52 are shown by the white circles.

In step 302, it is judged whether or not a railway line has been selected. If a railway line has not been selected, the routine moves on to step 308.

Here, when the user operates the operation section 14 and moves a cursor 56 onto the railway line 52 whose image accumulated amounts he/she wishes to display and selects (clicks on) the railway line 52, the routine moves on to step 304.

In step 304, for each of the stations on the selected railway line, the image accumulated amounts of the respective eras (e.g., each 10 years) are computed from the image database 18 by the image accumulated amount computing section 28. This may be carried out by extracting, from the management data of the image database 18, the records of the railway line name which matches the railway line name of the selected railway line, and computing the image accumulated amounts for the respective eras on the basis of the photographing dates of the records.

Figure 9:
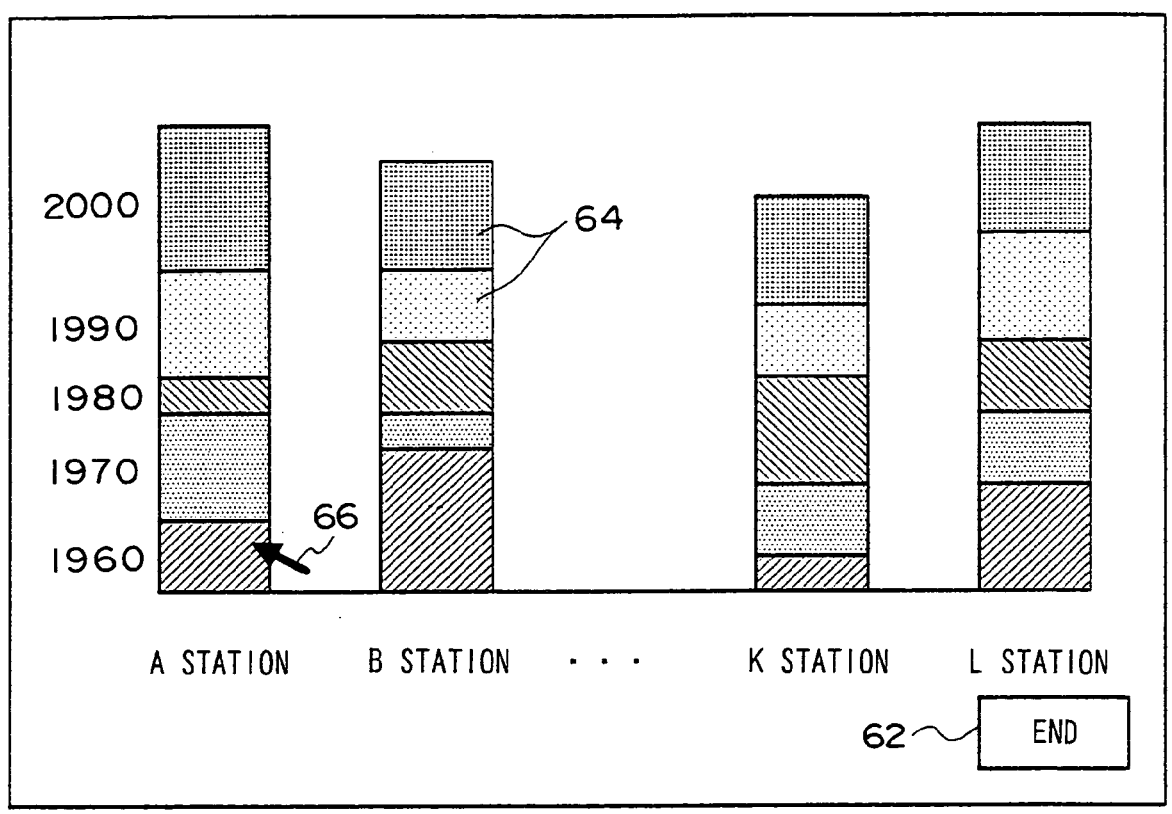
FIG. 9 is a diagram showing an example of an image accumulated amount display screen in accordance with the embodiment of the present invention.

In next step 306, on the basis of the calculated image accumulated amount for each era at each station, an image of an image accumulated amount display screen 60 such as shown in FIG. 9 is generated by the display image generating section 30, and is outputted to the display section 20. In this way, the image accumulated amount display screen 60 is displayed at the display section 20.

As shown in FIG. 9, in the image accumulated amount display screen 60, the image accumulated amounts for respective 10-year periods at each station are displayed by divided bar graphs. The magnitude of the surface area of each divisional region 64 of each divided bar graph expresses the size of the image accumulated amount for that era. For example, the graph for station B shows that the image accumulated amount is greatest for the 1960's, and becomes smaller in the order of the 2000's, the 1980's, the 1990's, and the 1970's. In this way, the magnitudes of the image accumulated amounts of the respective eras at the respective stations can be perceived intuitively and easily. By selecting an end button 62 in this screen, the display of the image accumulated amount display screen 60 is ended.

Figure 10:
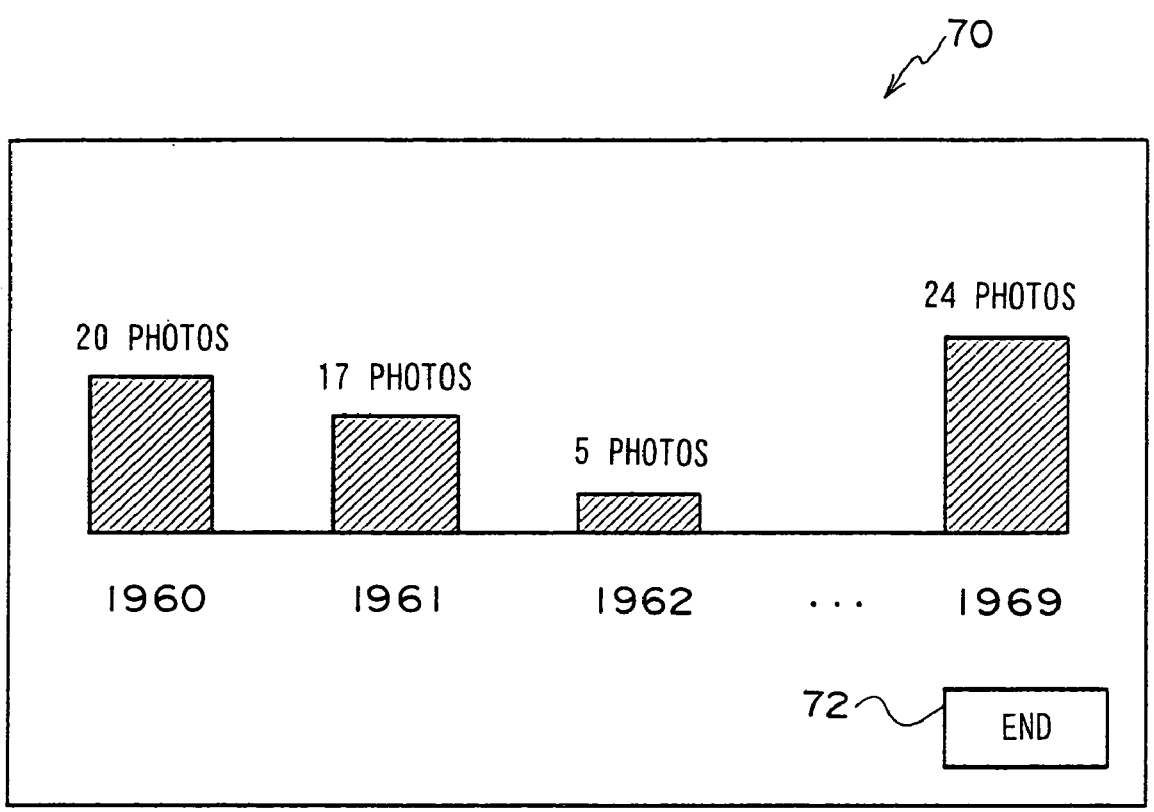
FIG. 10 is a diagram showing an example of a detailed image accumulated amount display screen in accordance with the embodiment of the present invention.

When the user wishes to display more detailed image accumulated amounts of an era, as shown in FIG. 9, the user moves the cursor 66 to the position of the divisional region 64 of the desired era, and selects on it. In FIG. 9, the cursor 66 is positioned at the position of the 1960's of station A. By carrying out such an operation, on the basis of the image accumulated amounts of the respective years of the selected era, the image of a detailed image accumulated amount display screen 70 such as shown in FIG. 10 is generated by the display image generating section 30, and outputted to the display section 20. In this way, the detailed image accumulated amount display screen 70 is displayed at the display section 20.

In the detailed image accumulated amount display screen 70, the image accumulated amounts of the respective years of the selected era are displayed as a bar graph. In this way, the image accumulated amount of each year can be easily recognized. Note that, as shown in FIG. 10, it is preferable that the type of hatching of the bar graph is the same as the type of hatching of the divisional region 64 which was selected in the divided bar graph of FIG. 9. Here, when an end button 72 is selected, display of the detailed image accumulated amount display screen 70 is ended.

A structure is possible in which, when the bar graph of the desired year is selected on in the state in which the detailed image accumulated amount display screen 70 is displayed, the images whose year of photographing is that year are displayed so as to be able to be browsed.

In step 308, it is judged whether or not any of the stations 54 have been selected in the state in which the railway line map 50 shown in FIG. 8 is displayed. Here, when the user operates the operation section 14 and moves the cursor 56 onto the station 54 whose photographed images relating to that station (hereinafter, "station images") he/she wishes to display in the order of eras, and selects (clicks on) the station 54, the routine moves on to step 310.

In step 310, station image display processing is carried out. Specifically, first, the display image generating section 30 generates the image of a station image display screen 80 such as shown in FIG. 11, and outputs it to the display section 20. In this way, the station image display screen 80 is displayed at the display section 20.

The station image display screen 80 is structured so as to include a photographed image display region 82, a photographing year display region 84, and an operation region 86.

A photographed image relating to the selected station is read out from the image data area 34 of the image database 18, and displayed at the photographed image display region 82. For example, the oldest photographed image of the selected station is first read-out and displayed in the photographed image display region 82.

The photographing year of the photographed image displayed at the photographed image display region 82, is read-out from the management data area 32 of the image database 18, and is displayed in the photographing year display region 84.

An operation lever 88, which is for switching the photographed image displayed in the photographed image display region 82, and an end button 90 are displayed in the operation region 86. The operation lever 88 can be moved in the top-bottom direction of the screen by being dragged in the direction of the arrow in FIG. 11 together with the cursor by that much. For example, at first, display is carried out with the operation lever 88 positioned at the bottommost position. Namely, at first, the display image generating section 30 generates the image of the station image display screen 80 in which the oldest photographed image of the selected station is displayed at the photographed image display region 82, the photographing year of that photographed image is displayed at the photographing year display region 84, and the operation lever 88 is displayed at its lowermost position. The display image generating section 30 outputs this image of the station image display screen 80 to the display section 20.

Then, when the user drags the operation lever 88 toward the top side of the screen, the display image generating section 30 reads out from the image database 18 the next newest photographed image with respect to the photographed image which is currently being displayed in the photographed image display region 82. The display image generating section 30 generates, and outputs to the display section 20, an image in which this photographed image is displayed in the photographed image display region 82, the photographing year thereof is displayed in the photographing year display region 84, and the operation lever 88, which has been moved upward in accordance with the amount of dragging, is displayed in the operation region 86.

Conversely, when the user drags the operation lever 88 toward the bottom side of the screen, the display image generating section 30 reads out from the image database 18 the next oldest photographed image with respect to the photographed image which is currently being displayed in the photographed image display region 82. The display image generating section 30 generates, and outputs to the display section 20, an image in which this photographed image is displayed in the photographed image display region 82, the photographing year thereof is displayed in the photographing year display region 84, and the operation lever 88, which has been moved downward in accordance with the amount of dragging, is displayed in the operation region 86.

Namely, due to the user dragging the operation lever 88 together with the cursor toward the top side of the screen, the photographed image which is displayed at the photographed image display section 82 is successively switched from an older image to a newer one. Due to the user dragging the operation lever 88 together with the cursor toward the bottom side of the screen, the photographed image which is displayed at the photographed image display section 82 is successively switched from a newer image to an older one. Note that the direction of operation of the operation lever 88 and the order of display are not limited to the same, and may be opposite.

In this way, images relating to a selected station can be displayed in order of eras from the past through the present, and the changes over time relating to that station can be easily recognized.

Then, when an end button 90 on the station image display screen 80 is selected, the screen returns to the display of the railway line map 50 shown in FIG. 8.

In step 312, it is judged whether or not the end button 58 has been selected. Here, if the end button 58 has been selected, the present routine ends and returns to the main routine. If the end button 58 has not been selected, the routine returns to step 302, and processings which are the same as those described above are carried out.

In this way, in the present embodiment, images which are photographed in vicinities of stations of railway lines are accumulated, and the image accumulated amounts for each station are determined as needed and can be outputted in a form which enables easy recognition of the image accumulated amounts. Therefore, images photographed at respective stations from the past through the present can be managed collectively, and can be used in various applications such as, for example, the preparation of the history of a locality along a railway line by a railway company, the compilation of a company history, or the like.

Further, a station is selected from a railway line map, and by operation of the user, images relating to the selected station can be displayed in the order of the eras from the past through the present. Thus, the changes over time relating to a station can be easily recognized, with the impression of playing a game.

Note that, in the present embodiment, a case is described in which the photographed image is switched by operating the operation lever 88 on the screen. However, the present invention is not limited to the same, and an input device shaped as an operation lever can be provided as a portion of the operation section 14, and the photographed image can be switched by operating this input device. In this way, the operation can be made to be more entertaining.

Further, in the present embodiment, when the station 54 is selected in the state in which the railway line map 50 is displayed, the station image display screen 80 is displayed. However, the station image display screen 80 may be displayed when a station name is selected in the state in which the image accumulated amount display screen 60 is displayed.

Further, in the present embodiment, description is given of a case in which the image accumulated amounts are displayed by bar graphs. However, the present invention is not limited to the same. Provided that the image accumulated amounts can be recognized intuitively and easily, other types of graphs such as circle graphs or the like may be used.

Further, the divisional regions 64 do not have to be distinguished by the types of hatching, and may be distinguished by colors.

It is also possible to not display only the bar graphs alone as in the case of the image accumulated amount display screen 60 shown in FIG. 9, but to display bar graphs corresponding to the stations 54 in vicinities of the stations 54 on the railway line map 50 shown in FIG. 8.

In the present embodiment, description was given of a case in which the image accumulated amounts of images photographed in vicinities of respective stations of a railway line are displayed. However, the present invention is not limited to the same, and the present invention can be applied as well to cases of displaying image accumulated amounts of images photographed in vicinities of, for example, bus stops on a bus route.

Further, in the embodiment of the invention, images shot in regard to areas around each station on railway lines are described as the display targets, but the invention is not limited thereto. The range of the targets may be extended to images shot in areas associated with stations, such as sightseeing areas, prefectures, cities, wards, towns or the like including the stations.

Furthermore, in the embodiment of the invention, an image read by a scanner and an image read from a recording medium are exemplified as the images registered in the image database 18, but the invention is not limited thereto. Images shot with cellular phones may be registered in the image database 18.

Moreover, in order to reduce the load of the processing of identifying the shot location when the image shot thereat is registered in the image database 18, information obtained by reading a two-dimensional bar code, in which the shot location and information thereof including the representative object image and the like of the shot location are recorded, may be read together with the shot image and registered in the image database 18 in association with the shot image. The two-dimensional bar codes are printed in advance on, for example, signboards provided at the shot locations together with descriptions, magazines and brochures including articles of the shot locations, and the like.

Further, besides the shot images of stations on railway lines or bus stops, the present invention is applicable to any images as long as they are shot at specific locations with which multiple locations are associated in advance. For example, the present invention is applicable to images and the like shot at particular checkpoints on a route including multiple checkpoints as can be seen in a stamp tour (i.e., a tour in which people affix stamps at checkpoints) carried out in orienteering or events, a tour of tourist-attracting cities, towns and villages, and the like. Moreover, these routes may be linked with transportation lines such as railway lines.

Figure 5:
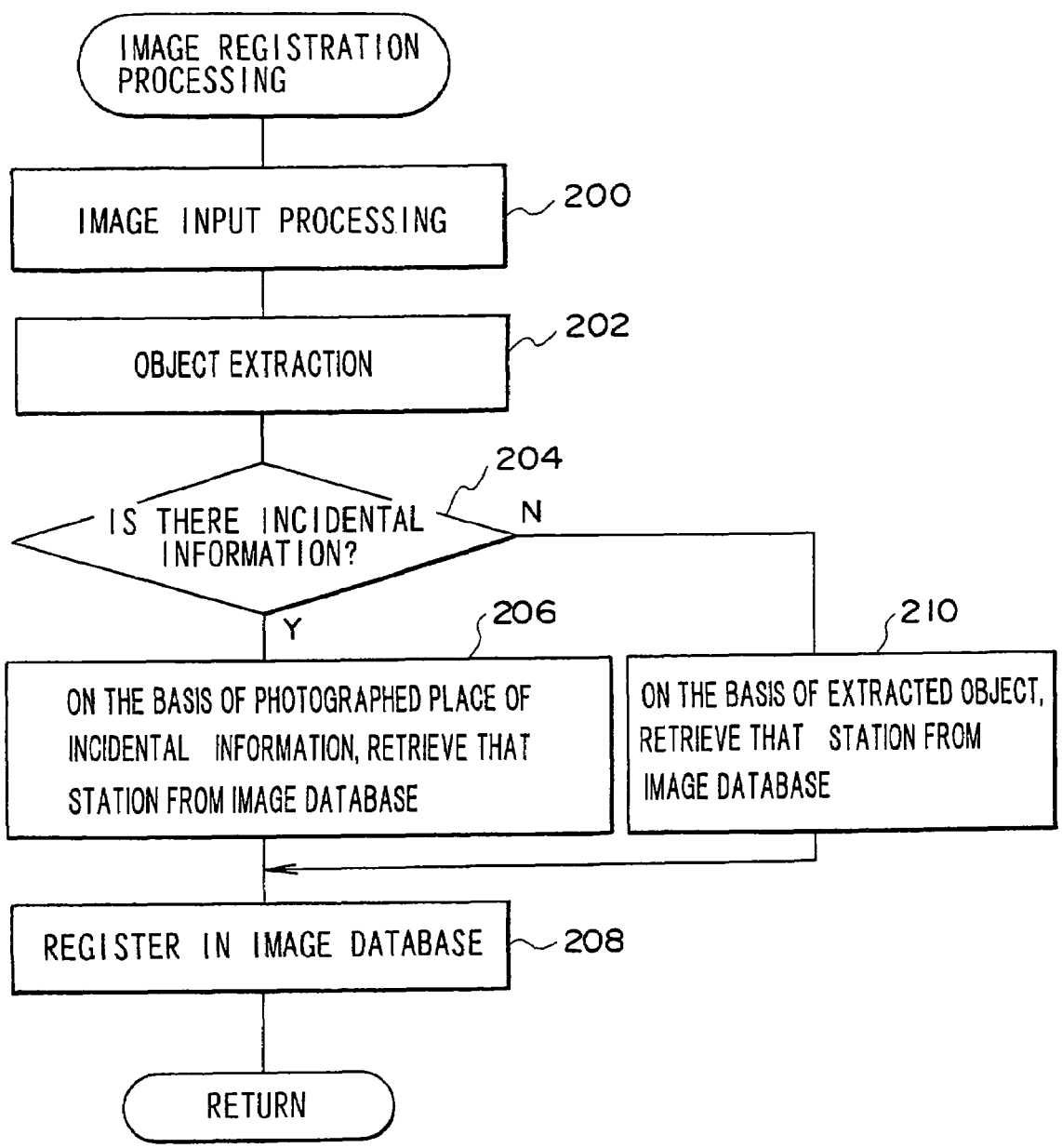
FIG. 5 is a flowchart of an image registration processing routine in accordance with the embodiment of the present invention.
Figure 6:
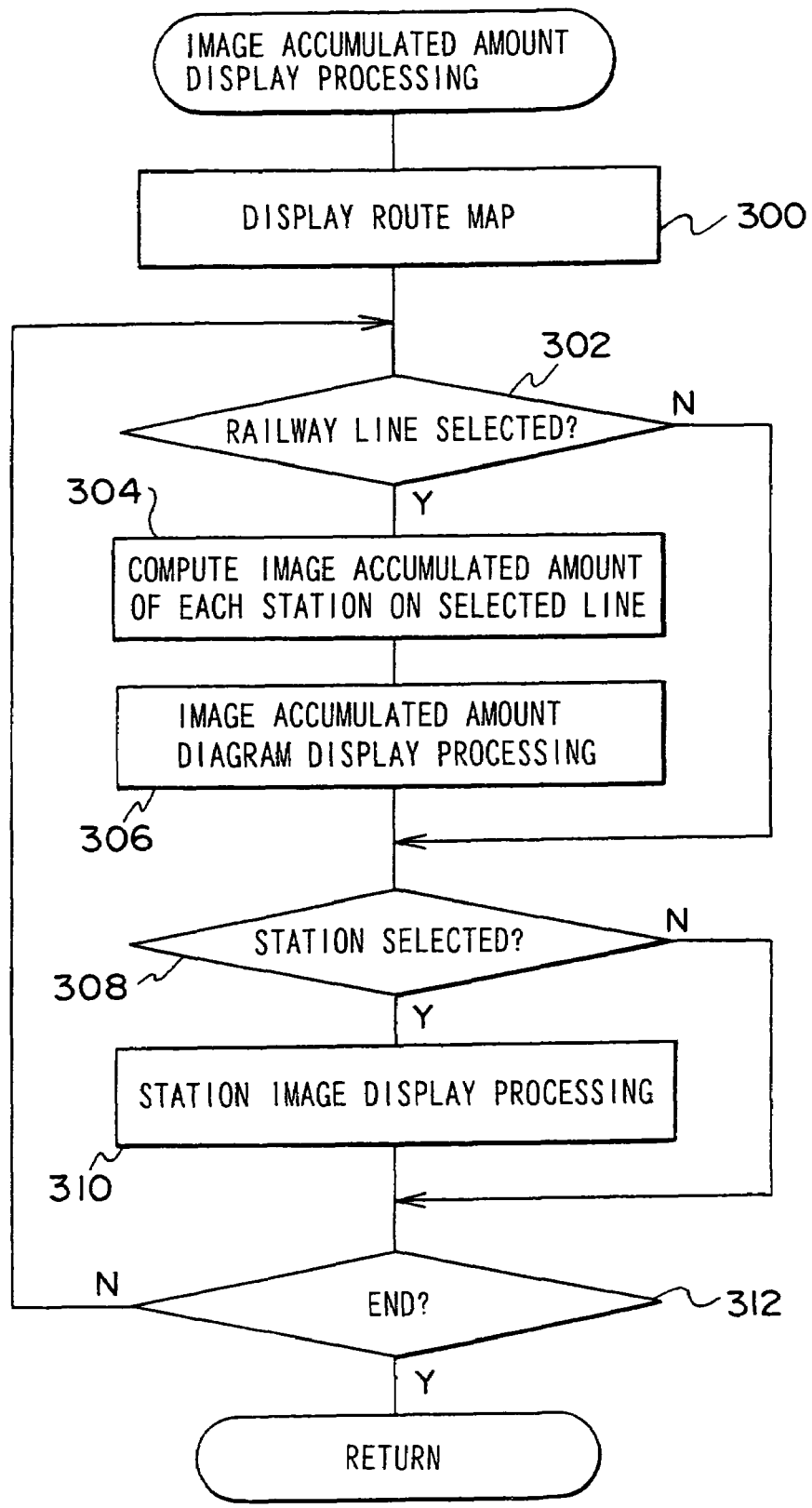
FIG. 6 is a flowchart of an image accumulated amount computing routine in accordance with the embodiment of the present invention.

Furthermore, in the embodiment of the invention, a case has been described in which, when the shot location of the input image was not able to be identified, namely, when it is determined in step 206 or step 210 of the routine in FIG. 5 that the input image was not shot in the vicinities of any stations on the transportation lines, the input image is not registered in the image database 18. However, a message indicating that the input image is not registered in the image database 18 may be displayed on the display unit 20. Alternatively, the following processing may be executed.

For example, when a record, in which the shot location included in the incidental information is included in the peripheral region represented by the peripheral region coordinates, is absent in the image database 18 in step 206 of the routine in FIG. 5, a record having the shot location coordinates closest to the shot location included in the incidental information is searched. The peripheral region represented by the peripheral region coordinates of the searched record is extended so as to include the shot location included in the incidental information, and the peripheral region coordinates are rewritten with the extended region being regarded as a new peripheral region. Subsequently, the station corresponding to the shot location of the input image is identified as the station represented by a station name in that record, and the image is registered.

The peripheral region coordinates are preferably set so that no blank regions are generated. With the above processing, the input images are prevented from being unregistered in the image database 18.

Further, in step 210 of FIG. 5, when the record in which the calculated degree of similarity is equal to or greater than the predetermined threshold is absent, the predetermined threshold is gradually decreased within a predetermined range, and the degree of similarity is compared each time the predetermined threshold is decreased. The search is stopped when the calculated degree of similarity becomes equal to or greater than the predetermined threshold. When the degree of similarity does not become equal to or greater than the predetermined threshold even with the lower limit of the predetermined threshold range, the shot location in a record having a degree of similarity closest to the lower limit is identified as the shot location of the input image, and the image is registered.

In either case, a message indicating that the above processing has been executed and the image has been registered may be displayed on the display unit 20. Alternatively, before the processing is executed, a message prompting approval of the user may be displayed on the display unit 20, such that the processing is executed after the approval of the user is obtained.

Further, in the embodiment of the invention, when the shot location is identified in step 210 on the basis of the extracted representative object image, it may be determined, for each object, whether or not an object image having a high degree of similarity with the object image extracted from the input image is present in the partial image database of the identified class, and the shooting time corresponding to the object image with the highest degree of similarity may be identified as the shooting time of the input image. However, the shooting time may be determined in a similar manner to the above identifying processing for the shot location.

Moreover, in the embodiment of the invention, a case has been described in which the accumulated image amounts of each station are displayed by a bar graph in which the accumulated image amounts of respective eras are distinguished by different classes of hatching. Conversely, the accumulated image amounts of each era may be displayed by a bar graph in which the accumulated image amounts of respective stations are distinguished by different classes of hatching.

The present embodiment describes a case in which images relating to the station selected by operation of the user are displayed in the order of eras from the past through the present. However, when displaying the photographed images in the order of eras, processing may be carried out as follows.

For example, at the time of switching the photographed image which is displayed in the photographed image display region 82 of the station image display screen 80 shown in FIG. 11, the degree of similarity between the current photographed image, i.e., a first representative object image corresponding to a first photographed image before the switching, and the photographed image to be displayed next, i.e., a second representative object image corresponding to a second photographed image after the switching, is computed. Then, if the computed degree of similarity is greater than or equal to a predetermined threshold value, it is judged that the same object image is included in the first photographed image and the second photographed image. Enlargement/reduction processing and trimming processing are carried out on the second photographed image such that at least one of the size and the position of the second representative object image included in the second photographed image, is substantially the same as the first representative object image. Then, the image after processing is displayed in the photographed image display region 82. In this way, the changes over time of the representative object of the selected station can be easily recognized.

The photographed images can be displayed in order of size of the representative object image from the largest size to the smallest size, or in the opposite order, without enlargement/reduction processing or trimming processing.

Further, in order to be able to even more easily recognize the representative object image, the representative object image may be displayed in an enhanced manner by a method such as surrounding the representative object image by a frame, making the colors of the representative object image darker, or the like.

In a case in which, for all of the photographed images relating to the selected station, the degrees of similarity between the representative object images are computed and there exist representative object images whose degrees of similarity are greater than or equal to a threshold value, all or some of the photographed images corresponding thereto may be displayed together in the photographed image display region 82.

It can be judged whether or not there are a predetermined number or more photographed images whose photographing time periods are substantially the same, and if it is judged that there are a predetermined number or more of such photographed images, these photographed images can be displayed together in the photographed image display region 82.

When plural photographed images are displayed together in the photographed image display region 82, the photographed image display region 82 is divided into plural regions, and the photographed images are displayed in the divisional regions, respectively. However, if the number of divisions is large and it is difficult to view the photographed images, the number of divisions can be limited to a predetermined value, and the remaining photographed images which cannot be displayed can be displayed by switching the page.

Further, when plural photographed images are displayed together in the photographed image display region 82, if the number of monotone images among the plural photographed images is equal to or greater than a predetermined number (for example half of the photographed images), the other photographed images, namely color images, may be converted into monotone images and displayed together. In this case, the tone of monotone images may be made uniform, such as in sepia tone. Judgement as to whether or not an image is a monotone image can be carried out by, for example, judging whether or not the differences among the RGB values of the image are small, or whether or not the chromaticness values of the image are small. The invention can be provided with a setting mode for enabling a user to select whether or not the conversions of the photographed images are to be carried out automatically.

In a case of normal displaying of the photographed images, i.e., a case in which the photographed images are not displayed together in the photographed image display region 82, the above described conversion of color images into monotone images can be also carried out before the displaying. Further in this case, the enlargement/reduction processing or trimming processing can be also carried out in order to adjust the size of the photographed images.

Furthermore, image processing for improving image quality such as gradation correction processing or color correction processing may be carried out with respect to the photographed images before they are displayed at the display section 20. Alternatively, this image processing can be carried out with respect to the photographed images in advance at the time when the images are registered in the image database 18.

As described above, the present invention can be realized by an image playback device which can display, in order of eras and by operation of a user, images which have been photographed at specific places such as in the vicinities of stations of a railway line or the like.

It suffices for the specific places to be arbitrary, geographical places in predetermined regions, and the specific places may be specific places on the route of a railway as in the present embodiment, or a bus or the like. Further, the specific places are not limited to such places.

The image playback device may be structured so as to display, at a display section, a region map displaying the specific places, and such that the specific place can be selected from the region map by a selecting section. It goes without saying that route maps or the like of railways, as in the present embodiment, or buses or the like are encompassed by the region map. Moreover, it should be clear that, in addition thereto, an arbitrary map which can visually display specific places, such as a map of a geographical region or a map for guiding tourists or the like, can be utilized.

The display control section may be structured to display, at the display section, a region map in which the predetermined region and the specific places are displayed, and the specific place can be selected from the region map by the selecting section. In this way, the user can easily select the desired specific place.

The display control section may further display, at the display section, photographing time periods of the photographed images relating to the specific place. In this way, the user can easily recognize the photographing time periods of the displayed photographed images relating to the specific place.

The image playback device may further have: an extracting section extracting representative object images included in the photographed images; and a computing section computing a degree of similarity between the representative object images.

The computing section may compute the degree of similarity between a first representative object image, which corresponds to a first photographed image displayed at the display section, and a second representative object image, which corresponds to a second photographed image to be displayed next, and when the computed degree of similarity is greater than or equal to a predetermined threshold value, the display control section may display, at the display section, an image obtained by carrying out at least one of enlargement/reduction processing and trimming processing on the second photographed image, so that at least one of a size and a position of the second representative object image is substantially the same as the first representative object image.

The computing section may also compute degrees of similarity between the representative object images, and when there are representative object images whose computed degrees of similarity are greater than or equal to a predetermined threshold value, the display control section may display together, at the display section, at least some of the photographed images corresponding thereto.

The image playback device can be configured so that the display control section displays the representative object images in an enhanced manner.

The display control section may configured so as to display together, at the display section, at least some of photographed images whose photographing time periods are substantially the same, among the photographed images relating to the selected specific place.

The display control section may further carry out predetermined image processing with respect to the photographed images before displaying the photographed images at the display section.

The image playback device can be also configured so that, when the number of monotone images among the photographed images which are to be displayed together is equal to or greater than a predetermined number, the display control section converts the images other than the monotone images into monotone images, and displays the photographed images together.

The image playback device may further have: an image inputting section inputting photographed images relating to the specific places; and a registering section registering, in the image database, the photographed images relating to the specific places and inputted by the image inputting section.

A structure is possible in which the image database includes: a management data area storing management data; an image data area storing image data; and a representative object image data area storing representative object image data, and the representative object image data is image data of representative objects included in images expressed by the image data, and the management data includes information of the specific places, photographed image data addresses relating to the specific places, and information of photographing time periods.

The management data may be structured so as to include at least one of representative object image addresses of the photographed images, coordinates of the photographed places of the photographed images, and coordinates of vicinity regions of the photographed places of the photographed images.

The display control section may, on the basis of the information of the management data area, read-out, from the image database and in the order of the eras, the photographed images relating to the specific place, and display the photographed images at the display section.

The display control section may, on the basis of the information of the management data area, display, at the display section, the photographing time periods of the photographed images relating to the specific place.

Further, the present invention can be provided as a method for operating the image playback device which is structured as described above.

What is claimed is:

1. An image playback device comprising:
 an image database storing, in association with one another, specific places on a route, photographed images relating to the specific places, position information of photographed places of the photographed images, and photographing time period information of the photographed images;

a display section for displaying the specific places on the route;

a selecting section for selecting a specific place on the route;

an operation section for instructing display, in order of eras, of the photographed images relating to the specific place selected by the selecting section; and a display control section which, in accordance with operation of the operation section, reads-out the photographed images relating to the specific place from the image database in the order of the eras, and displays the photographed images at the display section.

2. The image playback device of claim 1, wherein the display control section displays, at the display section, a route map in which the route and the specific places are displayed, and the selecting section can select the specific place from the route map.

3. The image playback device of claim 1, wherein the display control section further displays, at the display section, photographing time periods of the photographed images relating to the specific place.

4. The image playback device of claim 1, further comprising:

an image inputting section for inputting photographed images relating to the specific places; and a registering section for registering, in the image database, the photographed images relating to the specific places and inputted by the image inputting section.

5. The image playback device of claim 1, wherein the image database includes:

a management data area for storing management data;

an image data area for storing image data; and a representative object image data area for storing representative object image data, wherein the representative object image data is image data of representative objects included in images expressed by the image data, and the management data includes information of the specific places, photographed image data addresses relating to the specific places, and information of photographing time periods.

6. The image playback device of claim 5, wherein the management data includes at least one of representative object image addresses of the photographed images, coordinates of the photographed places of the photographed images, and coordinates of vicinity regions of the photographed places of the photographed images.

7. The image playback device of claim 5, wherein, on the basis of the information of the management data area, the display control section reads-out, from the image database and in the order of the eras, the photographed images relating to the specific place, and displays the photographed images at the display section.

8. The image playback device of claim 5, wherein, on the basis of the information of the management data area, the display control section displays, at the display section, the photographing time periods of the photographed images relating to the specific place.

9. An image playback method comprising:

storing, in association with one another and in an image database, specific places on a route, photographed images relating to the specific places, position information of photographed places of the photographed images, and photographing time period information of the photographed images;

displaying the specific places on the route;

selecting a specific place on the route;

instructing display, in order of eras, of the photographed images relating to the selected specific place; and in accordance with said instructing, reading-out the photographed images relating to the specific place from the image database in the order of the eras, and displaying the photographed images.

10. The image playback method of claim 9, further comprising displaying a route map in which the route and the specific places are displayed, and enabling selection of the specific place from the route map.

11. The image playback method of claim 9, further comprising displaying photographing time periods of the photographed images relating to the specific place.

12. The image playback method of claim 9, further comprising:

inputting photographed images relating to the specific places; and registering, in the image database, the inputted photographed images relating to the specific places.

13. The image playback method of claim 9, wherein the image database includes:

a management data area for storing management data;

an image data area for storing image data; and a representative object image data area for storing representative object image data, wherein the representative object image data is image data of representative objects included in images expressed by the image data, and the management data includes information of the specific places, photographed image data addresses relating to the specific places, and information of photographing time periods.

14. The image playback method of claim 13, wherein the management data includes at least one of representative object image addresses of the photographed images, coordinates of the photographed places of the photographed images, and coordinates of vicinity regions of the photographed places of the photographed images.

15. The image playback method of claim 13, further comprising, on the basis of the information of the management data area, reading-out, from the image database and in the order of the eras, the photographed images relating to the specific place, and displaying the photographed images.

16. The image playback method of claim 13, further comprising, on the basis of the information of the management data area, displaying, at the display section, the photographing time periods of the photographed images relating to the specific place.

17. An image playback device comprising:

an image database storing, in association with one another, specific places in a predetermined region, photographed images relating to the specific places, position information of photographed places of the photographed images, and photographing time period information of the photographed images;

a display section for displaying the specific places;

a selecting section for selecting a specific place on a screen;

an operation section for instructing display, in order of eras, of the photographed images relating to the specific place selected by the selecting section; and a display control section which, in accordance with operation of the operation section, reads-out the photographed images relating to the specific place from the image database in the order of the eras, and displays the photographed images at the display section.

18. The image playback device of claim 17, wherein the display control section has a display image generating section which displays, at the display section, a region map in which the specific places and the predetermined regions are displayed, and the selecting section can select the specific place from the region map.

19. The image playback device of claim 18, wherein the display image generating section further displays, at the display section, photographing time periods of the photographed images relating to the specific place.

20. The image playback device of claim 17, wherein the predetermined region is a region on a route.

21. The image playback device of claim 17, further comprising:
an extracting section extracting representative object images included in the photographed images; and
a computing section computing a degree of similarity between the representative object images.

22. The image playback device of claim 21, wherein the computing section computes the degree of similarity between a first representative object image, which corresponds to a first photographed image displayed at the display section, and a second representative object image, which corresponds to a second photographed image to be displayed next, and
when the computed degree of similarity is greater than or equal to a predetermined threshold value, the display control section displays, at the display section, an image obtained by carrying out at least one of enlargement/reduction processing and trimming processing on the second photographed image, so that at least one of a size and a position of the second representative object image is substantially the same as the first representative object image.

23. The image playback device of claim 21, wherein, for all of photographed images relating to the selected specific place, the computing section computes degrees of similarity between the representative object images, and
when there are representative object images whose computed degrees of similarity are greater than or equal to a predetermined threshold value, the display control section displays together, at the display section, at least some of the photographed images corresponding thereto.

24. The image playback device of claim 22, wherein the display control section displays the representative object images in an enhanced manner.

25. The image playback device of claim 17, wherein the display control section displays together, at the display section, at least some of photographed images whose photographing time periods are substantially the same, among the photographed images relating to the selected specific place.

26. The image playback device of claim 17, wherein the display control section carries out predetermined image processing with respect to the photographed images before displaying the photographed images at the display section.

27. The image playback device of claim 23, wherein, when the number of monotone images among the photographed images which are to be displayed together is equal to or greater than a predetermined number, the display control section converts the images other than the monotone images into monotone images, and displays the photographed images together.

28. An image playback method comprising:
storing, in association with one another and in an image database, specific places in a predetermined region, photographed images relating to the specific places, position information of photographed places of the photographed images, and photographing time period information of the photographed images;
displaying the specific places in the predetermined region;
selecting a specific place in the predetermined region;
instructing display, in order of eras, of the photographed images relating to the selected specific place; and
in accordance with said instructing, reading-out the photographed images relating to the specific place from the image database in the order of the eras, and displaying the photographed images.

29. The image playback device of claim 1, wherein the routes are predetermined.

30. The image playback device of claim 1, wherein each era spans a predetermined number of years.

31. The image playback device of claim 1, wherein the display control section controls the display so as to distinguish between the eras.

32. The image playback device of claim 1, wherein, when the specific place is selected by the selection section, displaying a plurality of eras and displaying for each of said plurality of eras a number of images of the specific selected place tat are dated in a respective era.

33. The image playback device of claim 32, wherein dates of said number of images comprise time period information.

* * * * *